V. S. HARDEY.
MEANS FOR REGULATING TIMEPIECES AND THE LIKE.
APPLICATION FILED FEB. 28, 1921.

1,396,198.

Patented Nov. 8, 1921.

Witnesses.
W. P. Kilroy
Harry R. White

Inventor:
Virgil S. Hardey
By Brown Boettcher and Denner Attys

UNITED STATES PATENT OFFICE.

VIRGIL S. HARDEY, OF CHICAGO, ILLINOIS.

MEANS FOR REGULATING TIMEPIECES AND THE LIKE.

1,396,198.  Specification of Letters Patent.  Patented Nov. 8, 1921.

Application filed February 28, 1921. Serial No. 448,527.

*To all whom it may concern:*

Be it known that I, VIRGIL S. HARDEY, a citizen of the United States, residing at Chicago, in the county of Cook and State of Illinois, have invented a certain new and useful Improvement in Means for Regulating Timepieces and the like, of which the following is a full, clear, concise, and exact description, reference being had to the accompanying drawings, forming a part of this specification.

My invention relates to means for regulating timepieces and the like, more particularly to means for correcting for the effect of temperature changes upon the movement of a clock.

It is well known in the art, that clocks subject to temperature change will vary from their proper setting, going either fast or slow according to the change in temperature. The usual manner of correcting for such variations is by adjusting the oscillations of the escapement. In a clock having a balance or pendulum spring for controlling the escapement, this correction is commonly made by adjusting the tension of such spring. Where a pendulum is employed, the correction is made by adjusting the length of the pendulum. I find that in order to properly regulate a time piece and to maintain such proper regulation, a manual adjustment and an automatic adjustment are necessary. The prior art provisions for meeting such requirements have been complex and expensive. Attempts to avoid these disadvantages have not provided the accuracy of regulation so essential. The demand for a simple and inexpesive mechanism through which accurate regulation is secured is great.

My invention aims to provide a novel, simple and inexpensive adjusting mechanism through which notwithstanding its simplicity and relatively low cost, that accuracy of adjustment which is so essential may be maintained.

My invention aims further to provide not only a manual adjustment and an adjustment for automatically correcting for temperature changes, but means for quickly and easily regulating the amount of correction which is automatically effected by the automatic adjustment for a given change in temperature.

In what I now consider to be the preferred embodiment of my invention, the automatic adjusting means is interposed between a manually adjustable finger piece and the escapement. The automatic adjustment thereby not only maintains the automatic adjustment of the movement, but forms the connecting link through which manual adjustment is quickly and conveniently had. The adjusting arrangement of my invention may be either in the nature of an attachment, or it may be embodied or built into the clock mechanism upon the construction thereof. When in the nature of an attachment its installation is had with practically no alteration of the clock mechanism. When embodied in the original construction of the clock such embodiment is had with a minimum amount of variation from the usual construction.

While my invention is particularly adapted for regulating the movement of a clock, it is applicable wherever an automatic correction for temperature change is desired in connection with a manual adjustment, and I do not intend, therefore, to limit the invention to a particular use or purpose, nor to the details of the particular embodiment shown.

In order that those skilled in the art may be fully acquainted with the nature and scope of my invention, I shall describe a specific embodiment of the invention in connection with the accompanying drawings, in which.

Figure 1:
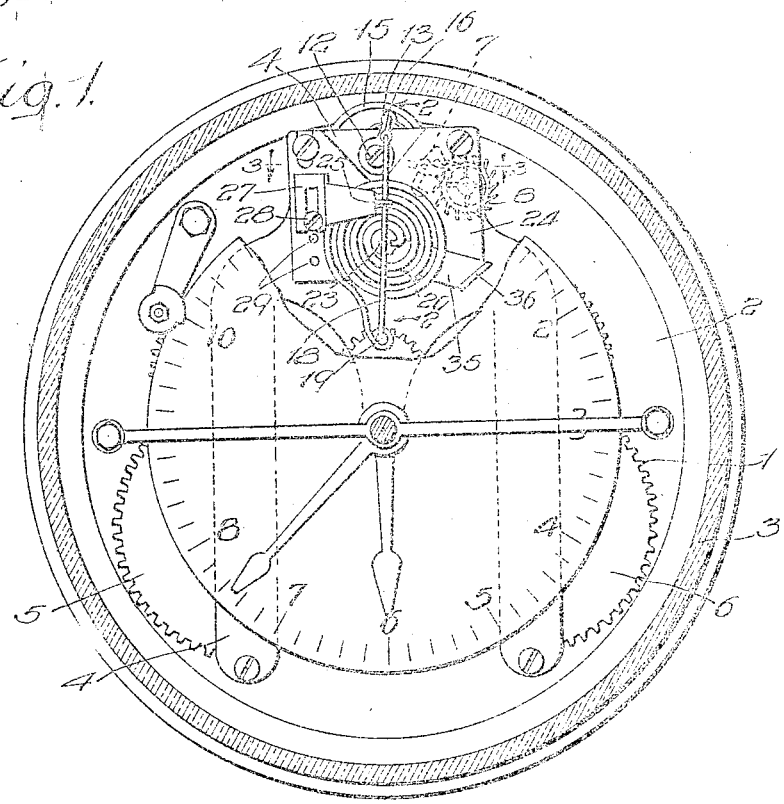
Figure 1 is a front elevational view of a clock embodying my invention with the cover or casing in section and a portion of the dial broken away.
Figure 3:
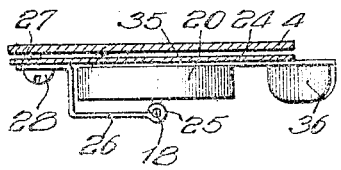
Fig. 3 is a fragmentary horizontal section taken substantially on the line 3—3 of Fig. 1.

Referring now to the drawings, I have shown and shall describe just so much of the clock itself as is necessary to impart a clear understanding of the particular embodiment of my invention in connection therewith.

The clock mechanism 1 mounted upon a suitable base 2 is adapted to be incased in a cover or casing 3 formed of glass or any other suitable or preferred material. The movement or mechanism of the clock is built up of the usual spring motor and escapement mechanism mounted upon shafts secured in a vertical front frame plate 4 and a similar rear plate (not shown). Springs (not shown) housed within suitable barrels to the rear of the gears 5 and 6 furnish the power for driving the anchor escapement member 7 through an escapement wheel 8 and the usual intermediate driving train including the necessary gears and pinions. The anchor escapement has suitable driving connection with a balance shaft 9, so that such shaft will be oscillated with the oscillations of the escapement member 7. The tension of a coiled balance or pendulum spring 10 controls the speed of escapement of the movement as well understood by those skilled in the art. The inner end of the coiled spring 10 is secured to the balance shaft 9. The outer end of the spring 10 is fixed in a bracket member 11 secured to and extending rearwardly from the front frame plate 4.

The forward end of the balance shaft 9 bears in a stud 12 mounted in the frame plate 4 adjacent the upper edge thereof. An arm 13 loosely mounted upon the shank of the stud 12 adjacent the front face of the frame piece 4 extends upwardly and carries a rearwardly extending finger 14 at its upper end. This rearwardly extending finger 14 coöperates with the balance spring 10 to vary the tension and thereby the vibrations thereof as well understood in the art when the arm 13 is swung about the shank of the stud 12 as will be hereinafter explained. The shaft 9 may be provided with the usual balance wheel 15 and the driving connection between the anchor escapement and the shaft 9 may be had through this balance wheel if so desired. A finger 16 fixedly secured to the arm 13 and extending forwardly therefrom is provided at its forward end with an eye through which eye the rearwardly bent upper end 17 of the main adjusting arm 18 extends.

Figure 2:
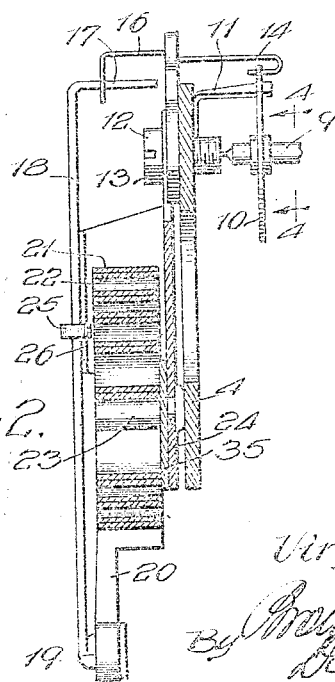
Fig. 2 is an enlarged fragmentary vertical section taken substantially on the line 2—2 of Fig. 1.
Figure 4:
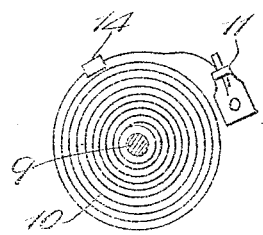
Fig. 4 is a rear elevational view of the balance or pendulum spring taken on the line 4—4 of Fig. 2.

The lower end of the adjusting arm 18 is connected at 19 with the downwardly extending outer convolution of an automatic regulating or adjusting member 20. The automatic adjusting member 20 comprises laminæ or strips 21 and 22 (Fig. 2) of two metals having different co-efficients of expansion suitably secured together and coiled or turned up into a spiral. The inner end of this coil or spiral 20 is fixedly secured to a stud or pivot 23. The reduced shank of the stud or pivot 23 extends through a mounting piece or plate 24 carried by the frame 4 in proper spaced relation therefrom and is headed over as shown.

The vertical portion of the adjusting arm 18 extends through an eye 25 carried by one end of an angle piece 26. The eye 25 provides the pivot about which the arm 18 is swung as will be hereinafter explained to vary the tension of the balance spring 18 and thereby the rate of escapement of the movement. A slotted mounting base 27 at the opposite end of the angle piece provides for adjustably mounting the same upon the plate 24 through a suitable set screw 28. Obviously, by the vertical adjustment of the angle piece 26, thereby provided for, the position of the pivot 25 about which the arm 18 is swung may be varied. Threaded openings 29 in the plate 24 provide for changing the position of the set screw 28 to still further increase the range of adjustment of the eye or pivot 25.

It will now be apparent, the laminæ 21 and 22 of the automatic adjusting member 20 having different degrees of expansion under the same temperature, that a change in temperature will swing the outer convolution of the coiled member 20 either outwardly or inwardly (depending upon the temperature change) swinging the arm 18 through the connection 19 about its pivot 25. The movement of the finger 14 upon such swinging of the arm 18 serves to increase or decrease the tension of the spring 10 to counteract the effect of a temperature change upon the movement. For example, if the temperature change is such as to cause the movement to lose one second in every sixty, the automatic regulator is adjusted so that it will when subjected to such temperature increase the speed of the movement one second in every sixty, thereby compensating for or counteracting the effect of the temperature change upon the movement.

A very fine adjustment of the automatic regulator for a certain temperature change may be quickly and conveniently had by adjusting the position of the pivot 25 as hereinbefore set forth. By adjustment of such pivot, the proportion between the length of arm 18 below such pivot and the length of arm 18 above such pivot may be varied to vary the amount of swing of the finger 14 and consequently the amount of adjustment of the spring 10 for a given swing of the connection 19.

An arm 35 fixed at its inner end to the stud 23 for rotation therewith is provided with a finger piece 36 at its outer end. This arm 35 provides for manual adjustment of the movement, swinging of such arm rotating the stud 23 which rotation is thereupon imparted through the coiled automatic adjusting member 20 to the lower end of the arm 18 swinging such arm about its pivot 25 to vary the tension of the spring 10 through the engagement of the adjusting finger 14 therewith. Thus, the automatic adjusting member 20 not only automatically maintains the proper regulation of the movement, but forms the connecting link through which manual adjustment is had. The resulting adjusting mechanism while extremely simple and inexpensive provides that high order of accuracy of adjustment which is so essential.

I have found the adjusting means of my invention admirably adapted for regulating controlling clocks and the like such as are employed in connection with printometers for example, which are necessarily subjected to severe and varying weather conditions.

I claim:

1. In combination, a driving mechanism, temperature sensitive means for automatically regulating the speed of said driving mechanism, means for adjusting the amount of automatic adjustment by said temperature sensitive means for a given temperature change, and means for manually regulating the speed of said driving mechanism through said temperature sensitive means.

2. In combination, a driving mechanism, means for controlling the speed of said driving mechanism, an arm for manually regulating said controlling means, a thermostat interposed between the controlling means and said arm for automatically adjusting said controlling means upon a change in temperature, manual regulation of the controlling means being had through said thermostat.

3. In combination, a clock mechanism, an adjusting arm for regulating said mechanism, a thermally operable member for actuating said adjusting arm, pivot for said arm, said pivot being adjustable to regulate the amount of regulation of the clock mechanism for a given thermal change.

4. In combination, a clock mechanism, an adjusting arm for regulating said mechanism, manually operable means for actuating said adjusting arm, a thermally operable member interposed between said manually operable means and the clock mechanism, said thermally operable member automatically regulating said mechanism upon a thermal change and forming the connection through which manual regulation is had, an adjustable pivot for said arm, said pivot controlling the amount of regulation for a given swing of the adjusting arm.

5. In combination, a clock mechanism having a frame, a balance shaft having a balance or escapement spring, a bearing stud for said shaft, an arm rotatably mounted upon said stud, an adjusting finger carried by said arm and coöperating with the balance or escapement spring to adjust the same upon rotation of said arm, a thermally operable member carried by the frame, an adjusting arm having connection with said thermally operable member to be actuated thereby upon a thermal change, said adjusting arm having connection with said first arm to actuate the same upon actuation of the adjusting arm, an adjustably mounted pivot for said adjusting arm, adjustment of said pivot varying the amount of adjustment of the balance or escapement spring for a given thermal change.

6. In combination, a clock mechanism having a frame, a balance shaft having a balance or escapement spring, a bearing stud for said shaft, an arm rotatably mounted upon said stud, an adjusting finger carried by said arm and coöperating with the balance or escapement spring to adjust the same upon rotation of said arm, a thermally operable member carried by the frame, an adjusting arm having connection with said thermally operable member to be actuated thereby upon a thermal change, said adjusting arm having connection with said first arm to actuate the same upon actuation of the adjusting arm, an adjusting piece having connection with the thermally operable member, said adjusting piece providing for manual adjustment of the balance or escapement spring through said thermally operable member.

7. In combination, manually operable regulating means, means adapted for regulation thereby, automatic regulating means interposed between said manually operable regulating means and the means adapted for regulation thereby, for automatically regulating the same, manual regulation of said means being had through said automatic regulating means.

8. In combination, a driving mechanism, means for regulating said driving mechanism, said means being movable, a pivot, said pivot being adjustable to control the amount of regulation of said driving mechanism for a given movement of said regulating means.

9. In combination, a clock mechanism, an adjusting arm for regulating said mechanism, manually operable means for actuating said adjusting arm, a pivot for said arm, said pivot being adjustable to regulate the amount of regulation of the clock mechanism for a given movement of said manually operable means.

10. In combination, a driving mechanism, means for regulating said driving mechanism, said means including an automatic regulating means and a manually operable regulating means, one of said regulating means being interposed between the driving mechanism and the other of said regulating means so that regulation of the driving mechanism by said other regulating means will be effected therethrough.

In witness whereof, I hereunto subscribe my name this 24th day of February, 1921.

VIRGIL S. HARDEY.